Dec. 9, 1924. 1,518,301
R. C. BENNER ET AL
DRY BATTERY
Filed Oct. 3, 1919
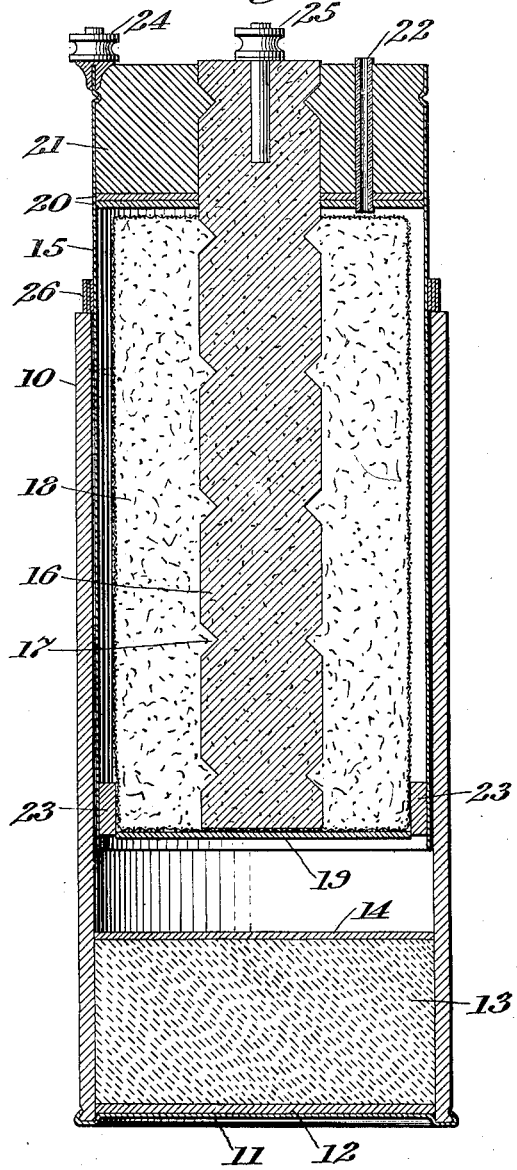
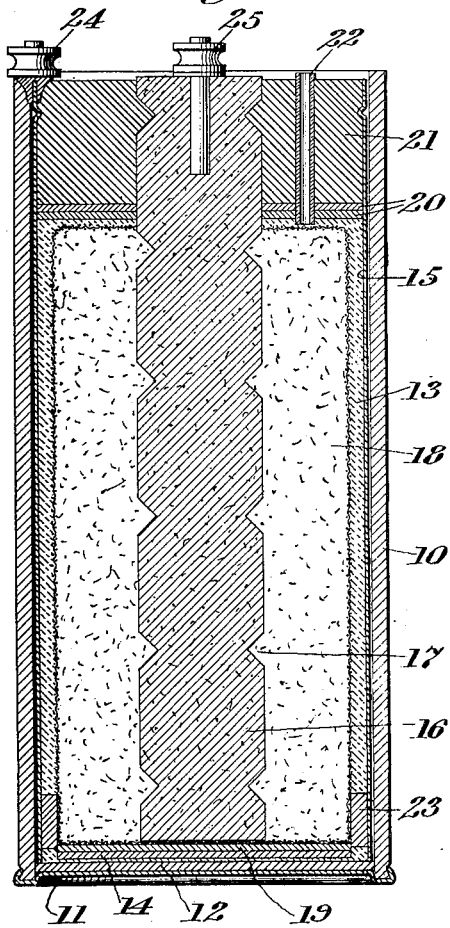

Patented Dec. 9, 1924.

1,518,301

UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

DRY BATTERY.

Application filed October 3, 1919. Serial No. 328,250.

*To all whom it may concern:*

Be it known that we, (1) RAYMOND C. BENNER and (2) HARRY F. FRENCH, citizens of the United States, residing at Fremont, in the county of Sandusky and State of Ohio, have invented certain new and useful Improvements in Dry Batteries, of which the following is a specification.

This invention relates to primary batteries of the type which, although containing all of the elements of an operative battery, can be kept or stored in inactive condition for an indefinite period, and can then be rendered active by a simple manipulation of the cell parts. A battery of this type has been heretofore disclosed in United States Patent No. 1,289,433, granted December 31, 1918, to H. F. French.

A primary object of the present invention is to provide a battery of the above type in which the activating material, usually in the form of paste, is supported within the cell but out of physical or electrical contact with either electrode until it is desired to put the cell into commission; at which time, by a simple manipulation of the cell parts, the activating material is pressed into operative position between the electrodes, and the cell becomes active.

A preferred embodiment of the invention is illustrated in the accompanying drawing wherein:

Figure 1 is a central longitudinal section of a cell of the so-called 6" or No. 6 type, in the inactive position; and Figure 2 is a similar view of the cell, the parts being in active position.

In said drawings, 10 represents a tubular carton or casing-member of insulating material; as illustrated, this is a heavy strawboard carton of the mailing-tube type, waterproofed by thorough paraffining or otherwise, and provided with a zinc or other metal bottom 11 protected by a paraffined pulp-board disk 12. The metallic bottom does not perform any electrical function in a cell of this particular type and may therefore be replaced by any suitable insulating material. 13 represents the pasty or liquid activating material, in sufficient volume for the requirements of the cell in active condition, and usually consisting of flour paste, to which may be added a small proportion of zinc chlorid or other preservative. The paste will preferably also contain electrolyte in order that a prompt electrical response may be obtained when the cell is put into commission. Preferably the paste is covered by a layer 14 of waterproof substance, which may be a quickly drying varnish or other material capable of preventing alteration in the consistence of the paste by evaporation of moisture. This layer may if desired be sufficiently rigid to serve as a retaining means for pastes having a marked tendency to flow, or for liquids.

15 represents the zinc electrode in the form of a cylinder snugly fitting the interior of the carton 10, and preferably thinly coated on the outside with paraffin or equivalent material to insure a tight fit.

The positive pole electrode may be of any construction suitable for cells of this type. As illustrated, it comprises a carbon element 16, preferably notched or recessed as indicated at 17 to afford an interlocking engagement with the molded carbon-manganese dioxid mix 18. The lower end of this composite electrode is preferably covered by a paraffined pulp-board washer 19 and the whole will preferably be wrapped with cloth as is common in the case of electrodes of the so-called bobbin type. 20 indicates paraffined pulp-board washers supporting a suitable sealing compound 21; and 22 an air vent, which may be formed of glass tubing of small bore. 23 represents spacing wedges or strips conveniently made of cork and serving to center the bobbin within and space it from the zinc electrode. In the form of cell chosen for illustration the binding posts 24 and 25 are both at the top, but as will readily be understood the structure may be modified to the so-called flashlight type of cell, in which the electrical connections are commonly made at opposite ends. 26, (Fig. 1) indicates adhesive tape or like material wound around the zinc cylinder at the top of the carton 10 and serving to hold it in the inactive position, but readily removed when the cell is to be put into commission.

The manner of placing the cell in commission will be readily understood from the foregoing description. In the position of parts illustrated in Fig. 1, the electrodes are entirely out of contact with the activating material, and the battery may be kept indefinitely without appreciable deterioration. It is placed in commission by exerting pressure at opposite ends in such manner as to effect a sufficient longitudinal adjustment of the two casing-members to press the bobbin down upon the activating material and thereby to force the latter upward until it fills the annular space between the electrodes. In case the precaution is observed to provide substantially the same concentration of electrolyte in the bobbin (which may be moist) and in the paste, the electrical response will be substantially instantaneous.

The construction may be modified in various ways without departing from my invention. For example, means other than those illustrated may be employed for suspending or retaining the electrode-containing element in its inactive position; and any means for imparting a longitudinal movement to the electrode-containing element, such for example as a screw thread, may be used instead of the direct longitudinal thrust chosen for illustration.

We claim:

1. In a dry battery, the combination of a two-part casing comprising tubular telescoping members capable of relative longitudinal adjustment, one of said members carrying spaced electrodes of opposite polarity, and the other member having non-conducting walls and carrying activating material out of contact with the said electrodes, said casing members adapted by longitudinal adjustment to cause said activating material to combine operatively with the electrodes.

2. In a dry battery, the combination of a two-part casing comprising tubular telescoping members capable of relative longitudinal adjustment, one of said members carrying spaced electrodes of opposite polarity, said electrodes consisting respectively of a carbon element having a molded mix applied thereto and a zinc element encircling the same, and the other member having non-conducting walls and carrying activating material out of contact with the said electrodes, said casing members adapted by longitudinal adjustment to cause said activating material to combine operatively with the electrodes.

3. A battery cell having a collapsible shell, and a frangible means within said shell in which an electrolyte is initially enclosed to separate the same from both the electro-positive and electro-negative elements of the cell, said frangible means being adapted to break under the collapsing movement of said shell to liberate said electrolyte and thereby initiate the electrical functioning of said battery.

4. A battery cell having a shell capable of a limited longitudinal collapsing movement under endwise pressure, and means initially retaining an electrolyte in separated relation to both the electro-positive and electro-negative battery elements, said means being operated by the collapsing movement of said shell to liberate said electrolyte for electro-chemical combination with said electro-positive and electro-negative elements.

5. The process of manufacture of a dry battery having a tubular shell-electrode and a bobbin comprising: placing paste in an auxiliary container, fitting the auxiliary container around the outside of the shell-electrode, and forcing the paste from the auxiliary container into the battery between the bobbin and the tubular shell.

6. The process of activating a dry battery having a bobbin and an outer shell comprising: placing paste in an auxiliary container, fitting the auxiliary container upon the bottom of the outer shell of the battery, and forcing the paste from the auxiliary container into the battery between the bobbin and the outer shell.

7. The process of manufacture of a dry cell having a bobbin in a tubular shell comprising: placing paste in an auxiliary container, forcing the paste from the auxiliary container into the space between the bobbin and the tubular shell, and closing the bottom of the shell.

8. The process of manufacture of a dry cell having a bobbin in a tubular shell comprising: placing paste in an auxiliary container, and forcing the paste from the auxiliary container into the space between the bobbin and the tubular shell.

9. In a dry cell adapted to remain inactive until it is desired to put it into use, a quantity of activating paste initially secured in a position adjacent the electrodes but out of contact therewith, said paste and electrodes being enclosed in the same outer container.

10. In a dry cell of the type described, a paste electrolyte, a bobbin consisting of a carbon electrode and a depolarizing mass, a tubular element surrounding said bobbin and connected thereto, leaving a space for electrolyte therebetween, and longitudinal means to center the bobbin within the tubular element.

11. In a dry cell of the type described, a tubular element containing a bobbin therein, with a space therebetween for electrolytic paste, and longitudinal means to center the bobbin, said means causing the paste to flow upwardly in a plurality of parallel streams when the paste is forced in from below.

12. In a dry cell of the type described, a bobbin consisting of a carbon electrode and a depolarizing mass, a tubular element surrounding said bobbin and connected thereto, leaving space for electrolyte therebetween, and circumferentially spaced members in said space to center the bobbin within the tubular element.

13. In a dry cell of the type described, a paste electrolyte, a bobbin consisting of a carbon electrode and a depolarizing mass, a tubular element surrounding said bobbin and connected thereto, leaving a space for electrolyte therebetween, and a plurality of parallel longitudinal spacing members to center the bobbin within the tubular element.

14. In a dry cell of the type described, a paste electrolyte, a bobbin, a tubular element surrounding said bobbin connected thereto, and a plurality of longitudinal spacing members to keep the bobbin from contact with the tubular element.

15. In a dry cell of the type described, a paste electrolyte, a bobbin, a tubular element surrounding said bobbin, a cup-shaped member fitting said tubular element, and means between said bobbin and the cup-shaped member to center the bobbin within the tubular element.

16. In a dry cell of the type described, a paste electrolyte, a bobbin consisting of a carbon electrode and a depolarizing mass, and a longitudinal spacing member of non-conducting material on the outside of said bobbin which assists in centering the bobbin in the cell.

17. A battery comprising a zinc casing having an open top and bottom, the positive electrode consisting of a carbon stick surrounded by a body of carbon-manganese mix, a covering of coarse material for the positive electrode, a washer of insulating material spacing the positive electrode within the casing, a layer of sealing wax on the washer, a support for the bottom of the positive electrode, a container forming the bottom for the casing and having slidable engagement therewith, and activating material supported within the container for the purpose set forth.

In testimony whereof, we affix our signatures.

RAYMOND C. BENNER.
HARRY F. FRENCH.